United States Patent [19]
Helmer-Metzmann et al.

[11] Patent Number: 6,096,856
[45] Date of Patent: Aug. 1, 2000

[54] POLYMER ELECTROLYTES AND PROCESS FOR THEIR PRODUCTION

[75] Inventors: Freddy Helmer-Metzmann, Essenheim; Andreas Schleicher, Beselich; Arnold Schneller, Messel; Helmut Witteler, Frankfurt, all of Germany

[73] Assignee: Hoechst Research & Technology Deutschland GmbH & Co. KG

[21] Appl. No.: 08/983,626

[22] PCT Filed: Jul. 16, 1996

[86] PCT No.: PCT/EP96/03118

§ 371 Date: Jun. 24, 1998

§ 102(e) Date: Jun. 24, 1998

[87] PCT Pub. No.: WO97/05191

PCT Pub. Date: Feb. 13, 1997

[30] Foreign Application Priority Data

Jul. 27, 1995 [DE] Germany .......................... 195 27 435
Dec. 22, 1995 [DE] Germany .......................... 195 48 425

[51] Int. Cl.[7] .............................. C08G 75/04; C08F 6/10; C08J 3/14
[52] U.S. Cl. ........................ 528/374; 528/373; 528/486; 528/487; 528/500; 528/503
[58] Field of Search ................................... 528/374, 373, 528/86, 486, 487, 500, 503

[56] References Cited

U.S. PATENT DOCUMENTS 3,948,865  4/1976  Brady et al. ............................ 260/79
4,110,265  8/1978  Hodgdon .................................. 521/30
4,199,321  4/1980  Blackwell et al. ....................... 8/168 R
5,153,305  10/1992  Tsuchida et al. ....................... 528/373

OTHER PUBLICATIONS

Journal of Polymer Science Part A: Polymer Chemistry Edition 27 (1980) Aug., No. 9, New York, U.S., pp. 3043–3051.

Polymers for Advanced Technologies 5 (1994) Jun., No. 6, Chichester, Sussex, GB, pp. 309–312.

*Primary Examiner*—Duc Truong
*Attorney, Agent, or Firm*—Frommer Lawrence Haug LLP

[57] ABSTRACT

The invention relates to a process for the chlorosulfonation of polyarylene sulfide in which the polyarylene sulfide is completely dissolved in chlorosulfonic acid at a temperature of −10 to +20 C., then agitated at reaction temperatures in the +5 to +20 C. range for a reaction time of 180 min at the most, possibly with the addition of oleum or acetic anhydride and the precipitated in an aqueous medium. The polyarylene sulfide is preferably poly-p-phenylene sulfide. The invention also relates to chlorosulfonated polyarylene sulfide produced by this process, which dissolves in a quantity of 10 to 50 wt % in N-methyl pyrrolidone and has a mean molecular weight Mw of >50,000 g/mol. Finally, the invention also relates to the use of chlorosulfonated polyarylene sulfide for the production of molding, foils, fibres or diaphragms with a proton conductivity in the 2 to 200 mS/cm range.

21 Claims, No Drawings

POLYMER ELECTROLYTES AND PROCESS FOR THEIR PRODUCTION

The present invention relates to compounds of the polyarylene sulfide-sulfonic acid class which have a good solubility in polar aprotic solvents, their use, and a process for the preparation of such polyarylene sulfide-sulfonic acids.

Polyarylene sulfide, in particular poly-p-phenylene sulfide, is known as a polymer which is distinguished by a particular resistance in respect of chemical and thermal influences. However, in order to be able to use this polymer for applications in aqueous media, it is expedient to increase its hydrophilicity. A method for achieving this aim by means of a sulfonation reaction is described in U.S. Pat. No. 4,110,265. In this method polyphenylene sulfide is reacted with oleum to give a sulfonated product which is employed as a cation exchanger material. Nevertheless, this material is described as a completely insoluble and furthermore also non-fusible crosslinked polymer, which makes any further processing of this material very difficult. U.S. Pat. No. 4,199,321 describes the improvement in the dyeability of PPS fibers by sulfonation with $H_2SO_4$, $SO_3$ and oleum. However, the fibers described here are sulfonated only on their surface.

The present invention was based on the object of providing a possibility, starting from customary polyarylene sulfides, of preparing polymers therefrom, by modification, which are soluble in polar aprotic solvents and which, for example, can easily be further processed to films. Another object comprises preparation of cation exchangers which are soluble in polar aprotic solvents starting from customary polyarylene sulfides.

This object is achieved by a polyarylene sulfide-sulfonic acid, the characterizing feature of which is to be seen in that it is soluble in polar aprotic solvents.

Examples of polar aprotic solvents which may be mentioned are N-methylpyrrolidone (NMP), dimethylacetamide (DMAC), dimethyl sulfoxide (DMSO) or dimethylformamide (DMF).

Suitable polyarylene sulfides in the context of the present invention are generally polymers of which the main chain is formed from the recurring units of the form

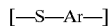

[—S—Ar—]

Ar in the formula is 1,4-phenylene, 1,3-phenylene, 1,2-phenylene, biphenylene, naphthylene, anthrylene or another bivalent aromatic unit. The average molecular weights $M_w$ of suitable polyarylene sulfides are preferably in the range from 2000 to 200 000 g/mol. Poly-p-phenylene sulfide which has an average molecular weight $M_w$ of >50 000 g/mol and in which the aromatic unit is exclusively 1,4-phenylene, which can be detected by $^1$H-NMR spectroscopy, is particularly preferably employed in the context of the present invention. Furthermore, those poly-[1,4-phenylene sulfide]s which are crosslinked to a limited extent, but nevertheless are fusible and soluble, are used. The particularly preferred polyarylene sulfides have become known on the market under the brand names ®Fortron (Fortron Industries) or ®Ryton (Phillips Petroleum).

A polyarylene sulfide-sulfonic acid in the context of the present invention is to be understood as meaning a polymer which is sulfonated to an extent of 0.1 to 100 mol %, preferably 2 to 40 mol %, based on the total amount of recurring units, i.e. the aromatic units carry sulfonic acid radicals (—$SO_3H$). Furthermore, the aromatic units can be chlorinated to an extent of 0 to 40 mol %, preferably 5 to 25 mol %, based on the total amount of recurring units, and the sulfide bridges between the aromatic units can be oxidized to sulfoxide to an extent of 0 to 100 mol %, likewise based on the total amount of recurring units.

The following structural formulae show examples of recurring units which the polyarylene sulfide-sulfonic acid referred to can contain.

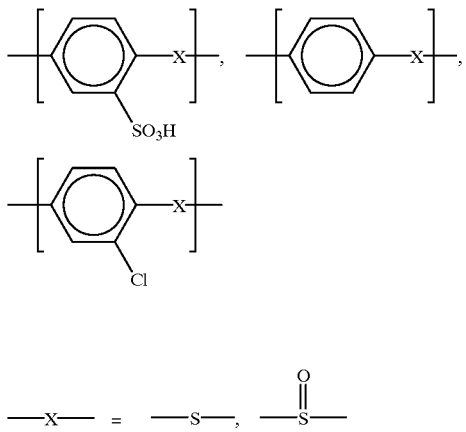

The polyarylene sulfide-sulfonic acid according to the invention dissolves in N-methyl-pyrrolidone in an amount of more than 5% by weight, the soluble polyarylene sulfide-sulfonic acid having an average molecular weight of 2000 to 200 000 g/mol, preferably ≧20 000 to 100 000 g/mol.

The process for the preparation of the polyarylene sulfide-sulfonic acid according to the invention can be defined as chlorosulfonation of polyarylene sulfide. In this process, the polyarylene sulfide is first dissolved completely in chlorosulfonic acid to the extent of 5 to 15% by weight at a temperature in the range from −10 to +20° C., the solution is then stirred at reaction temperatures in the range from 5 to 20° C., if appropriate with the addition of oleum or acetic anhydride, and the product is then precipitated in an aqueous medium. In an alternative process according to the invention, the polyarylene sulfide is first dissolved completely not in pure chlorosulfonic acid but directly in a mixture of chlorosulfonic acid and oleum.

The term chlorosulfonation in the context of the present invention is to be understood as meaning a one-pot reaction in which, in addition to the actual sulfonation of the aromatic units, oxidation of the sulfide bridges between the aromatic units to give sulfoxide takes place in part, and at the same time chlorination of the aromatic units also partly takes place.

The addition of oleum or acetic anhydride is not absolutely essential in order to obtain a polyarylene sulfide-sulfonic acid which is soluble according to the invention, but if the chlorosulfonation reaction is assisted by the additives mentioned, the duration of the reaction may be shortened correspondingly, where appropriate. Furthermore, overall higher degrees of sulfonation are achieved at a given solubility. The amounts of oleum or acetic anhydride ($Ac_2O$) added are usually 10 to 200% by weight of oleum, based on the weight of chlorosulfonic acid, or 5 to 30% by weight of acetic anhydride, likewise based on the weight of chlorosulfonic acid.

In another process step, the chlorosulfonated material is suspended in water and the suspension is boiled, so that the polyarylene sulfide-sulfonic acid chloride is converted into the polyarylene sulfide-sulfonic acid. This is also called sulfonated polyarylene sulfide below, and in addition to the sulfonic acid groups, can contain chlorine atoms bonded to the aromatic units and sulfoxide bridges. Solutions or dispersions in fluids, preferably in polar aprotic solvents and in solutions of these solvents with water and aliphatic alcohols, can be prepared from the polyarylene sulfide-sulfonic acid.

Polymers which, because of their high degree of sulfonation, are water-soluble are also obtained by the processes described above.

The oxidation state of the sulfide and sulfoxide bridges in the sulfonated polyarylene sulfide can be modified by the action of suitable oxidizing agents, for example $H_2O_2$, $O_3$, $HNO_3$ and $N_2O_4$, so that the sulfoxide content is increased to 100 mol % or the sulfide and sulfoxide bridges are converted into sulfone groups ($-SO_2-$) in an amount of up to 100 mol %. As referred to above, the materials thus obtained are also very resistant to heat and chemicals and soluble in polar aprotic solvents.

As a result of their solubility, the sulfonated polyarylene sulfide prepared by the process according to the invention and its oxidation products are outstandingly suitable for further processing to coatings, shaped articles, films or fibers. In particular, however, membranes which are distinguished by a proton conductivity in the range from 2 to 200 mS/cm, preferably from 5 to 50 mS/cm, can be produced from these. Such membranes are advantageously employed in electrolyte capacitors and in electrochemical cells, in particular in fuel cells and electrolysis cells. The electrolyte capacitors mentioned here are, in particular, structures called supercapacitors by the expert; these are electrolyte capacitors which have no electrically insulating layer between the electrode and electrolyte.

The following examples are intended to illustrate the invention in more detail for the expert, but without a limitation to the embodiments described concretely being deduced therefrom. All the examples were carried out with a PPS type obtainable from the Fortron Group as ®Fortron W300. This is an unbranched poly-[1,4-phenylene sulfide] having an average molecular weight $M_W$ of 90 000 g/mol.

EXAMPLE 1

12 g of PPS are dissolved in 220 ml of chlorosulfonic acid at the temperature stated in Table 1, while stirring. After 30 minutes, the solution is heated to the reaction temperature stated in Table 1 and stirred for the reaction time likewise stated. Working up is carried out by pouring into a mixture of 2 kg of ice and 600 ml of 30% strength sulfuric acid. The precipitate is then boiled in water for a period of 15 hours, and subsequently filtered off and dried. The properties of the product are stated in Table 1.

COMPARISON EXAMPLE 1

12 g of PPS are dissolved in 220 ml of chlorosulfonic acid as in Example 1. The solution temperature, solution time, reaction temperature and reaction time can be found in Table 1. After working up of the reaction product, which was carried out as in Example 1, a polymeric material of which the properties are stated in Table 1 was to be obtained.

COMPARISON EXAMPLE 2

15 g of PPS as in Example 1 are dissolved in 300 ml of chlorosulfonic acid. The solution temperature, solution time, reaction temperature and reaction time can be seen from Table 1. After working up as in Example 1, a product of which the properties can be seen from Table 1 was obtained.

EXAMPLE 2

As in Comparison Example 2, 15 g of PPS are dissolved in 300 ml of chlorosulfonic acid. The solution and reaction conditions are shown in Table 1. After working up of the reaction product as in Example 1, a pale yellow polymer of which the properties are stated in Table 1 was obtained. The intrinsic viscosity of the polymer in NMP solution is 1.5 dl/g.

TABLE 1

|  | Example 1 | Comparison Example 1 | Example 2 | Comparison Example 2 |
|---|---|---|---|---|
| Solution temperature | 5° C. | −25° C. | 5° C. | 5° C. |
| Solution time | 30 min | 120 min | 30 min | 30 min |
| Reaction temperature | 20° C. | 0° C. | 20° C. | 20° C |
| Reaction time | 150 min | 240 min | 60 min | 150 min |
| Reaction temperature additional | — | — | — | 50° C |
| Reaction time additional[4] | — | — | — | 60 min |
| Addition of oleum (9.8% of $SO_3$) in ml | — | — | 30 ml | — |
| Addition of $Ac_2O$ in ml | — | — | — | — |
| SF[1] | 4 | 14 | 2 | 35 |
| Cl[2] | 5 | 10 | 4 | 32 |
| $S_{NMP}$[3] | 20 | <3 | >40 | >3 |

[1]SF: Number of sulfur atoms additionally introduced per 100 phenylene sulfide recurring units according to elemental analysis
[2]Cl: Number of chlorine atoms introduced per 100 phenylene sulfide recurring units according to elemental analysis
[3]$S_{NMP}$: Solubility in N-methyl-pyrrolidone in % by weight
[4]Additional reaction time after addition of oleum or $Ac_2O$.

EXAMPLE 3

10 g of PPS are dissolved in 300 ml of chlorosulfonic acid. The solution and reaction conditions are stated in Table 2. After working up of the reaction product, a brownish-colored material of which the properties are stated in Table 2 was obtained.

EXAMPLE 4

A polymer obtained according to Example 2 is dissolved in N-methylpyrrolidone to the extent of 40% by weight, while heating. The solution, which is liquid and clear even at 20° C., was spread out with a doctor blade to a film having a thickness of 100 μm and the film was dried at a temperature of 100° C. in a circulating air oven. A transparent flexible film on which the following measurements were made was formed in this manner:

a) Tensile stress/elongation test in accordance with ISO 527. Elongation at break=4%.
b) Determination of the elasticity modulus in accordance with DIN 53 455 according to Young=6 GPa.
c) Crystal structure by wide-angle X-ray scattering ($Cu_{K\alpha}$-radiation, Ni-filtered, $2\Theta=3°$ to $58°$) →amorphous to X-rays.

EXAMPLE 5

15 g of PPS are dissolved in 300 ml of chlorosulfonic acid at the temperature stated in Table 2, while stirring. After 15 minutes, the solution is heated to the reaction temperature stated in Table 2 and stirred for the reaction time likewise stated. After addition of oleum and further reaction as stated in Table 2, the reaction product was worked up as described in Example 1 to give a pale yellow product. The properties of the product are stated in Table 2.

An acid/base titration of a solution of the product from Example 5 showed an ion exchange capacity of 0.93 mmol/g. The average molecular weight $M_w$ was determined by gel permeation chromatography and was 70 000 g/mol.

The ion exchange capacity (IEC) is determined by dissolving 150 mg of product in 100 ml of DMSO and titrating the solution with NaOH solution (0.025 N in $H_2O$/DMSO, 50% by volume of DMSO). The equivalence point is determined by a change in color of phenolphthalein or conductometrically.

The alternating current conductivity is measured on membranes having a thickness of 60 to 100 μm which are contacted with the electrodes of a commercially available conductometer via 0.5% strength sulfuric acid. For pretreatment, the membranes were laid in water for one day. The alternating current conductivity was measured at 20° C. and a frequency of 1000 Hz.

EXAMPLE 6

15 g of PPS were dissolved in 300 ml of chlorosulfonic acid as in Example 5. The other reaction conditions are stated in Table 2, and working up was carried out as in Example 1 to give a pale yellow product of which the properties are listed in Table 2. An acid/base titration of a solution of the product from Example 6 gave an ion exchange capacity of 3.2 mmol/g. The polymer is amorphous to X-rays.

EXAMPLE 7

5 g of PPS are dissolved in 100 ml of chlorosulfonic acid at the temperature stated in Table 2 as in Example 5, while stirring. The other reaction conditions can be seen from Table 2. After working up as in Example 1, a pale yellow product of which the properties are stated in Table 2 was obtained. Determination of the ion exchange capacity as in Examples 5 and 6 gave a value of 2.98 mmol/g. The polymer is amorphous to X-rays.

TABLE 2

| | Example 3 | Example 5 | Example 6 | Example 7 |
|---|---|---|---|---|
| Solution temperature | 5° C. | 5° C. | 5° C. | 20° C. |
| Solution time | 30 min | 15 min | 60 min | 20 min |
| Reaction temperature | 5° C. | 20° C. | 20° C. | 20° C. |
| Reaction time | | 30 min | — | — |
| Addition of $Ac_2O$ in ml | 100 | — | — | — |
| Addition of oleum (15% of $SO_3$) in ml | — | 100 | 100 | 33 |
| Reaction time additional[4] | 345 min | 120 min | 300 min | 145 min |
| IEC[1] | 2,75 | 3,2 | 2,98 | 0,93 |
| Cl[2] | >30 | 3 | 7 | 14 |
| $S_{NMP}$[3] | 10 | >20 | >20 | >50 |
| Conductivity in mS/cm[5] | — | 2,8 | 50 | 25 |

[1]IEC: Ion exchanger capacity in mmol/g
[2]Cl: Number of chlorine atoms introduced per 100 phenylenesulfide recurring units according to elemental analysis
[3]$S_{NMP}$: Solubility in N-methyl-pyrrolidone in % by weight
[4]Additional reaction time after addition of oleum or $Ac_2O$.
[5]Measurement as described in Example 5.

In all the examples, an ESCA spectroscopic analysis of the reaction product was carried out. It can be judged from this that the sulfide bridges are oxidized to sulfoxide to the extent of 20% to 80% in all the abovementioned materials.

EXAMPLE 8

The molar ratio of sulfide to sulfoxide bridges in the reaction product from Example 6 is 73 to 27, according to ESCA spectroscopy. The reaction product is suspended in 200 ml of a mixture of 30% $H_2O_2$ and glacial acetic acid (mixing ratio of 1:1 volumes), the suspension is boiled for 30 minutes and filtered and the product is dried. Thereafter, the molar ratio of sulfide to sulfoxide bridges is 15 to 85. The reaction product is soluble in NMP to the extent of >20% by weight.

EXAMPLE 9

The reaction product from Example 6 is gassed in a stream of ozone of 20 g of $O_3$ per $m^3$ for 15 minutes. Thereafter, no sulfide bridges and 22 mol % of sulfoxide bridges are to be detected by ESCA. The remainder are sulfone bridges, according to ESCA. The reaction product is soluble in NMP to the extent of >10% by weight.

The chemical yield of the reactions in the abovementioned examples was more than 90%.

What is claimed is:

1. A polyarylene sulfide-sulfonic acid, which dissolves in N-methylpyrrolidone in an amount of more than 5% by weight at a dissolving temperature of 5° C. obtained by the process which comprises dissolving the polyarylene sulfide completely in chlorosulfonic acid or in a mixture of chlorosulfonic acid with oleum or acetic anhydride, optionally adding oleum or acetic anhydride, and precipitating the product in an aqueous medium.

2. A polyarylene sulfide-sulfonic acid as claimed in claim 1, which is obtained from a polyarylene sulfide whose main chain is chiefly formed from the recurring units of the form

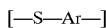

in which Ar is 1,4-phenylene, 1,3-phenylene, 1,2 phenylene, biphenylene, naphthylene, anthrylene or another bivalent aromatic unit.

3. A polyarylene sulfide-sulfonic acid as claimed in claim 2, in which Ar is 1,4-phenylene.

4. A polyarylene sulfide-sulfonic acid as claimed in claim 1, in which its average molecular weight $M_w$ is in the range from 2000 to 200,000 g/mol.

5. A polyarylene sulfide-sulfonic acid as claimed in claim 1, which carries sulfonic acid groups or sulfonic chloride groups in an amount of 0.1 to 100 mol %, based on the total amount of recurring units, and which carries chlorine atoms in an amount of 0 to 40 mol %, based on the total amount of recurring units.

6. A polyarylene sulfide-sulfonic acid as claimed in claim 1, in which the sulfide bridges between the aromatic units are oxidized to sulfoxide or to sulfone to an extent of 0 to 100 mol %, based on the total amount of recurring units.

7. A solution or dispersion of a polyarylene sulfide-sulfonic acid as claimed in claim 1 in a fluid.

8. A process for the preparation of a polyarylene sulfide-sulfonic acid which dissolves in N-methylpyrrolidone in an amount of more than 5% by weight at a dissolving temperature of 5° C., which comprises dissolving the polyarylene sulfide completely in chlorosulfonic acid or in a mixture of chlorosulfonic acid with oleum or acetic anhydride, optionally adding additional oleum or acetic anhydride and precipitating the product in an aqueous medium.

9. The process as claimed in claim 8, wherein poly-[1,4-phenylene sulfide] is employed as the polyarylene sulfide.

10. The process as claimed in claim 8, wherein the preparation of the solution in chlorosulfonic acid or in a mixture of chlorosulfonic acid with oleum or acetic anhydride is carried out at a temperature in the range from −10° C. to +20° C., and the subsequent further reaction is carried out at a temperature in the range from +5° C. to +20° C.

11. The process as claimed in claim 8, wherein the polyarylene sulfide is dissolved in chlorosulfonic acid in an amount of 5 to 15% by weight and optionally oleum is added in an amount of 10 to 200% by weight, based on the weight of chlorosulfonic acid.

12. The process as claimed in claim 8, wherein the acetic anhydride is employed in an amount of 1 to 30% by weight, based on the weight of the chlorosulfonic acid.

13. A polyarylene sulfide-sulfonic acid as claimed in claim 1, in which its average molecular weight $M_w$ is equal to or greater than 20,000 g/mol.

14. A polyarylene sulfide-sulfonic acid as claimed in claim 1, which carries sulfonic acid groups or sulfonic chloride groups in an amount of 2 to 40 mol %, based upon the total amount of recurring units, and which carries chlorine atoms in an amount of 5 to 25 mol %, based upon the total amount of recurring units.

15. A polyarylene sulfide-sulfonic acid as claimed in claim 1, in which the sulfide bridges between the aromatic units are oxidized to sulfoxide or to sulfone to an extent of 20 to 80 mol %, based on the total amount of recurring units.

16. In a method for producing coatings, shaped articles, films, membranes, or fibers, the improvement which comprises adding a polyarylene sulfide-sulfonic acid as claimed in claim 1.

17. The method according to claim 16, wherein the membrane is for filtration.

18. The method according to claim 17, wherein the membrane is for micro-, nano- and ultra filtration.

19. The method according to claim 15, wherein the membrane is for capacitors and electrochemical cells.

20. The method according to claim 15, wherein the membrane is for a fuel or electrolysis cell.

21. In a method for producing membranes which conduct protons having a proton conductivity in the range from 2 to 200 mS/cm, the improvement which comprises adding a polyarylene sulfide-sulfonic acid as claimed in claim 1.

* * * * *